(12) United States Patent
Amacker

(10) Patent No.: US 10,241,976 B2
(45) Date of Patent: *Mar. 26, 2019

(54) TECHNIQUES FOR PEER-TO-PEER COMMUNICATION

(71) Applicant: A9.com, Inc., Palo Alto, CA (US)

(72) Inventor: Matthew W. Amacker, Santa Clara, CA (US)

(73) Assignee: A9.COM, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/208,410

(22) Filed: Jul. 12, 2016

(65) Prior Publication Data

US 2016/0321216 A1    Nov. 3, 2016

Related U.S. Application Data

(63) Continuation of application No. 12/969,438, filed on Dec. 15, 2010, now Pat. No. 9,406,043.

(51) Int. Cl.
| | |
|---|---|
| *G06F 15/16* | (2006.01) |
| *G06F 17/21* | (2006.01) |
| *G06Q 10/10* | (2012.01) |
| *H04L 29/08* | (2006.01) |
| *G06F 3/0482* | (2013.01) |
| *G06F 3/0488* | (2013.01) |
| *G06F 17/22* | (2006.01) |
| *G06F 17/30* | (2006.01) |
| *H04L 12/58* | (2006.01) |

(52) U.S. Cl.
CPC .......... *G06F 17/212* (2013.01); *G06F 3/0482* (2013.01); *G06F 3/0488* (2013.01); *G06F 17/2247* (2013.01); *G06F 17/30864* (2013.01); *G06Q 10/10* (2013.01); *H04L 29/08072* (2013.01); *H04L 51/04* (2013.01); *H04L 67/02* (2013.01); *H04L 67/104* (2013.01)

(58) Field of Classification Search
CPC ... G06Q 10/10; H04L 29/08072; H04L 29/06; H04L 29/06034; H04L 12/1822
See application file for complete search history.

(56) References Cited

U.S. PATENT DOCUMENTS 6,480,885 B1 * 11/2002 Olivier ................ H04L 12/1859
709/202
7,171,473 B1 * 1/2007 Eftis ..................... H04L 12/581
709/224

(Continued)

OTHER PUBLICATIONS

Non-Final Office Action dated Dec. 3, 2012 issued in U.S. Appl. No. 12/969,438.

(Continued)

*Primary Examiner* — Siren Wei
(74) *Attorney, Agent, or Firm* — Hogan Lovells US, LLP

(57) ABSTRACT

Techniques for peer-binding are disclosed. In one embodiment, a method for peer-binding includes: receiving event information associated with an event detected on Web content associated with a trusted script executing on a first client computing device; and in response to a request, retrieving the received event information and sending the retrieved event information to a second client computing device. The second client computing device is peer-bound with the first client computing device via the trusted script associated with the Web content.

19 Claims, 9 Drawing Sheets

(56) References Cited

U.S. PATENT DOCUMENTS

| | | | |
|---|---|---|---|
| 7,669,123 B2 | 2/2010 | Zuckerberg et al. | |
| 8,037,093 B2 | 10/2011 | Tiu et al. | |
| 8,145,678 B2 | 3/2012 | Ramsay et al. | |
| 2002/0059404 A1 | 5/2002 | Schaaf et al. | |
| 2005/0177614 A1* | 8/2005 | Bourne | H04L 51/32 709/200 |
| 2005/0206657 A1* | 9/2005 | Arcas | G01C 21/36 345/660 |
| 2008/0259045 A1* | 10/2008 | Kim | G06F 3/0486 345/173 |
| 2009/0089246 A1* | 4/2009 | Chi | G06F 17/30864 |
| 2009/0164581 A1* | 6/2009 | Bove | G06F 17/30873 709/205 |
| 2009/0204601 A1 | 8/2009 | Grasset | |
| 2009/0288150 A1* | 11/2009 | Toomim | G06F 21/6218 726/5 |
| 2010/0049852 A1 | 2/2010 | Whitnah et al. | |
| 2010/0057785 A1 | 3/2010 | Khosravy et al. | |
| 2010/0115023 A1* | 5/2010 | Peled | G06F 17/3089 709/203 |
| 2011/0161430 A1 | 6/2011 | Callanan et al. | |
| 2011/0246294 A1 | 10/2011 | Robb et al. | |
| 2012/0016948 A1 | 1/2012 | Sinha | |
| 2012/0054253 A1 | 3/2012 | Guarraci | |

OTHER PUBLICATIONS

Amazon Web Services, "Amazon Simple Queue Service: Release Note and Developer Guide", API Version Nov. 5, 2012.

Non-Final Office Action dated Apr. 9, 2013 issued in U.S. Appl. No. 12/969,438.

Final Office Action dated Aug. 29, 2013 issued in U.S. Appl. No. 12/969,438.

Non-Final Office Action dated Feb. 20, 2014 issued in U.S. Appl. No. 12/969,438.

Final Office Action dated Jul. 31, 2014 issued in U.S. Appl. No. 12/969,438.

Non-Final Office Action dated Aug. 21, 2015 issued in U.S. Appl. No. 12/969,438.

Notice of Allowance dated Mar. 28, 2016 issued in U.S. Appl. No. 12/969,438.

Corrected Notice of Allowance dated Apr. 18, 2016 issued in U.S. Appl. No. 12/969,438.

\* cited by examiner

TECHNIQUES FOR PEER-TO-PEER COMMUNICATION

CROSS REFERENCE TO RELATED APPLICATION

This application is a Continuation of, and accordingly claims the benefit of, U.S. patent application Ser. No. 12/969,438, filed on Dec. 15, 2010, titled "TECHNIQUES FOR PEER-TO-PEER COMMUNICATION, which is hereby incorporated herein by reference.

BACKGROUND

Peer-to-peer (P2P) computing or networking is a distributed application architecture that partitions tasks or work loads between "peer" devices. Conventional peers are equally privileged, equipotent participants in the application. Peers make a portion of their resources, such as processing power, disk storage or network bandwidth, directly available to other network participants, without the need for central coordination by servers or stable hosts. Peers are both suppliers and consumers of resources, in contrast to the traditional client-server model where only servers supply, and clients consume. Peer-to-peer systems often implement an overlay network, built at application layer, on top of the native or physical network topology. Content is typically exchanged directly over the underlying Internet Protocol (IP) network.

A substantial software development effort has to be made in order to implement a peer-to-peer system, which typically requires a certain level of knowledge of back end server systems, Web protocols, database organization, and the like. Furthermore, a substantial amount of coding (e.g., thousands of lines of code) may be required in order to build and support a peer-to-peer application. Many software developers, e.g., JavaScript® coders, may primarily be involved in a JavaScript® coding on a client-side, for example, on a web browser. These professionals may not be familiar, or have a lot of experience with, development that has to occur on the back end in order to develop a peer-to-peer application. Accordingly, additional time, effort, and resources involving additional training and experimenting may be spent for developing a viable peer-to-peer application.

DETAILED DESCRIPTION

Figure 1:
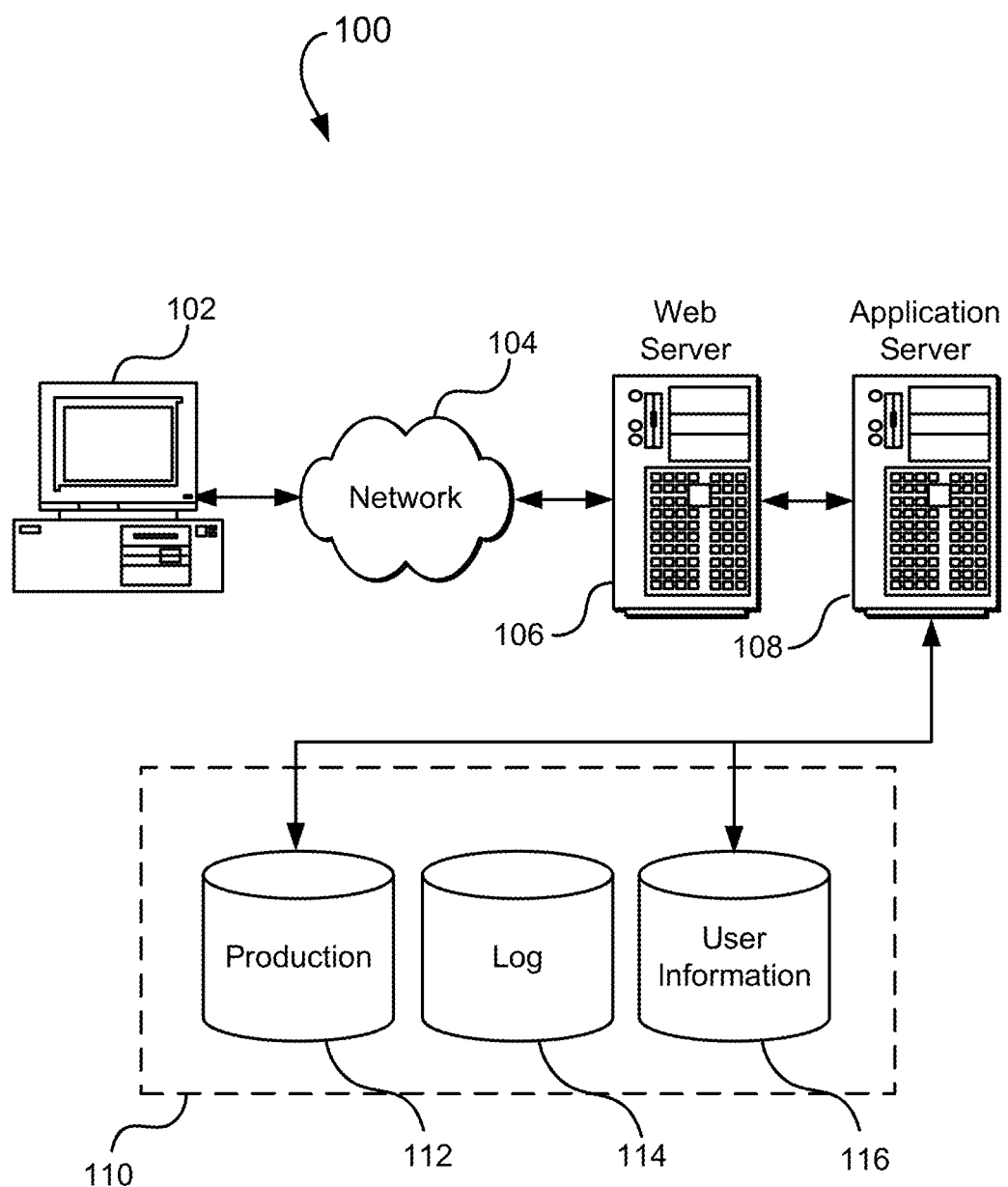
FIG. 1 illustrates an environment in which various embodiments can be implemented.

Techniques presented herein overcome the above-referenced and other deficiencies in existing approaches to peer communications and functionality. For example, techniques are presented for providing peer-to-peer infrastructure that will enable development of applications that are configured to communicate between devices or user browsers among a peer community. Normally, developing peer-to-peer applications in a Web environment requires creating a system configured to establish and register peer groups and a service to broadcast events to those peer groups that typically includes creating mechanisms on the "back end" for tracking, ordering, sourcing and identifying event targets. Various techniques described herein provide for creation of peer-to-peer applications that do not require intensive coding and may not utilize substantial, if any, back end server resources. Systems and methods in accordance with various embodiments employ a concept of "peer-binding" described below in greater detail.

Peer-binding generally includes grouping two or more users or devices according to at least one particular criterion, which hereinafter will be called a peer set type. For example, all users visiting a particular Web resource rendered over a computer network may be bound in a peer group, as will be described below in greater detail. An example of a Web resource is a Web site that is suitable for the World Wide Web and can be accessed through a Web browser and displayed on a screen r of a computing device, where at least some content for the Web site is pulled from at least one data store. Peer-binding enables an event that occurred on a Web resource (e.g., Web page) to be broadcasted to the other members of a peer group bound according to a chosen peer-binding method (e.g., to all users visiting a particular Web page). An event is an action that is usually initiated outside the scope of a program and that is handled by a piece of code inside the program. Typical sources of events include a user who creates an event, for example, through a keystroke or mouse click.

The above-described concept of peer-binding may be implemented in at least some embodiments through active scripting on a client side. Client-side scripting generally refers to the class of computer programs on the web that are executed by the user's Web browser, instead of server-side (on the web server). This type of computer programming enables Web pages to be scripted; that is, to have different and changing content depending on user input, environmental conditions (such as the time of day), or other variables. Client-side scripts are typically written in scripting languages such as, for example, JavaScript® or VBScript®.

Peer-binding may be accomplished by scripting a function referred to herein as a "peer-bind" function and embedding the scripted function in a Web resource visited by users. The peer-bind function may be implemented in a scripting language, in one embodiment, in a form of a standard library. A standard library for a programming language is the library that is conventionally made available in every implementation of that language. In one embodiment, a peer-bind library may capitalize on function calls that are known and widely used in scripting languages. For example, in JavaScript® there is a known "bind" command that is used to associate scripts with events fired by JavaScript® objects or DOM objects in Web environment. In one implementation, a code describing a peer-bind function may be implemented for the front end (e.g., embedded in a Web page) as a jQuery extension. The code, when executed, will implement a peer-bind function which may behave like the known "bind" function, the difference being a new handling function configured to get events from peers as well as local events and broadcast the events to the peer group. In one example, a JavaScript® "bind" command may be replaced with "peer bind," e.g., "jquery.peerbindjs." The following line of JavaScript® code may be placed in a page to enable a peer-bind function:
<script type="text/javascript" src="js.peerbind.com/0.2/jQuery.peerbindjs"></script>.

In one embodiment where a Web resource (e.g., a Web page) is configured with the peer-bind function, a process of a peer-to-peer communication may be implemented as follows. When a client browser renders the Web page, the peer-bind function of the page can begin executing. The peer-bind function may specify a peer set type (e.g., a page). The peer-bind function may further specify a type of event (e.g., a mouse click on a particular object on the page) to be broadcasted to a peer group bound by the peer set type. The peer-bind function may register a user visiting the page or, rather, a user's browser that rendered the page. For every browser registered with the page, a server rendering the page (in one embodiment, the page itself) may create a queue associated with the browser. When any registered browser posts an event (e.g., a user clicked on a designated object on the page), the event may be placed in all queues associated with registered browsers. When the browser or client device for a user polls the back end server rendering the page, the messages stored in the associated queues are retrieved and broadcasted to all registered users. For example, if a registered user clicked on a button "Go" embedded in the page (or performed another such action), this event will be broadcasted to all users visiting the page.

Enabling a peer-bind function on a Web resource (e.g., Web page) allows for the creation of interconnected Web applications. A migration of a peer-to-peer application support to a back end server may not even be necessary in some cases and may depend on availability and ease of access to back end server resources. Indeed, a back end service supporting the peer-bind function does not have to be complex at all and will not require extensive coding. The peer-bind service may be configured to be capable of executing at least the following concepts: create a queue, post a message (event), and get a message (event). In one example, the code for the back end service may comprise a simple set of Java® server pages (JSPs): registerjsp-handles creating the queue for a particular unique identifier (UID) associated with a browser; post.jsp-places messages into the peer queues; and poll.jsp-handles retrieving messages for a browser associated with the UID.

In one embodiment a Web resource such as a Web page may perform functions of a server supporting a peer-bind function. A page configured with the peer-bind function may be designated a "master peer," which then may accommodate login requests, content exchanges, and the like without having to implement these functions on a server typically needed for processing message exchange functions (such as, for example, a PHP server). One example of an implementation of a back end service for the peer-bind function will be described below in greater detail.

In one embodiment, a server supporting the peer-bind function may be configured as a shared resource, e.g., example.com. In another embodiment, a dedicated instance of an example.com server may be created. In this instance, the peer-bind function implemented in a scripting language, e.g., JavaScript® library, may be configured to "point" at a domain hosting the dedicated server through the defaults that are available in that JavaScript library.

In yet another embodiment, a peer-bind server may be configured to run on a mobile device, for example an iPhone®, which may act as the equivalent of a private "example.com." In this embodiment, the queues assigned to peers and messaging among peers may run over a local network instead of a remote server located on the wider network, e.g., Internet. The peer-bind server implemented on a mobile device will be capable of relaying messages between peer devices much faster than a conventional message exchange utilizing a mobile communications network. Accordingly, a peer-bind server may be used for supporting real time games on mobile devices. In some embodiments, one mobile device may be "tapped" onto the other and all messages would be relayed back and forth within the server for the game.

One skilled in the art will appreciate that there may be other implementations of the peer-bind function and service supporting the function. For example, the service may be offered as a part of remote computing services that together make up a cloud computing platform, offered over the Internet. The service may be configured to run in a Web server environment, such as a pure Java HTTP Web server environment. Examples of the service implementation described above should not be construed as limiting but merely as illustrations of the described techniques. Illustrative techniques for implementation of a peer-bind function in the Web environment will be described below in reference to FIGS. 1-9.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, and the environment includes a Web server 106 for receiving requests and serving content in response thereto, although for other networks, an alternative device serving a similar purpose could be used, as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein, the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to a viewer, which may be served to the viewer by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing log data 114, which can be used for reporting, generating statistics, and other such purposes. It should be understood that there can be many other aspects that may need to be stored in the data store, such as for page image information and access right information, which can be stored in any of the above-listed mechanisms as appropriate or in additional mechanisms in the data store 110. The data store 110 is operable, through logic associated therewith, to receive instructions from the application server 108 and obtain, update, or otherwise process data in response thereto. In one example, a viewer might submit a search request for a certain type of item. In this case, the data store might access the user information to verify the identity of the viewer, and can access the catalog detail information to obtain information about items of that type. The information then can be returned to the viewer, such as in a results listing on a Web page that the viewer is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limited to the scope of the disclosure.

Figure 2:
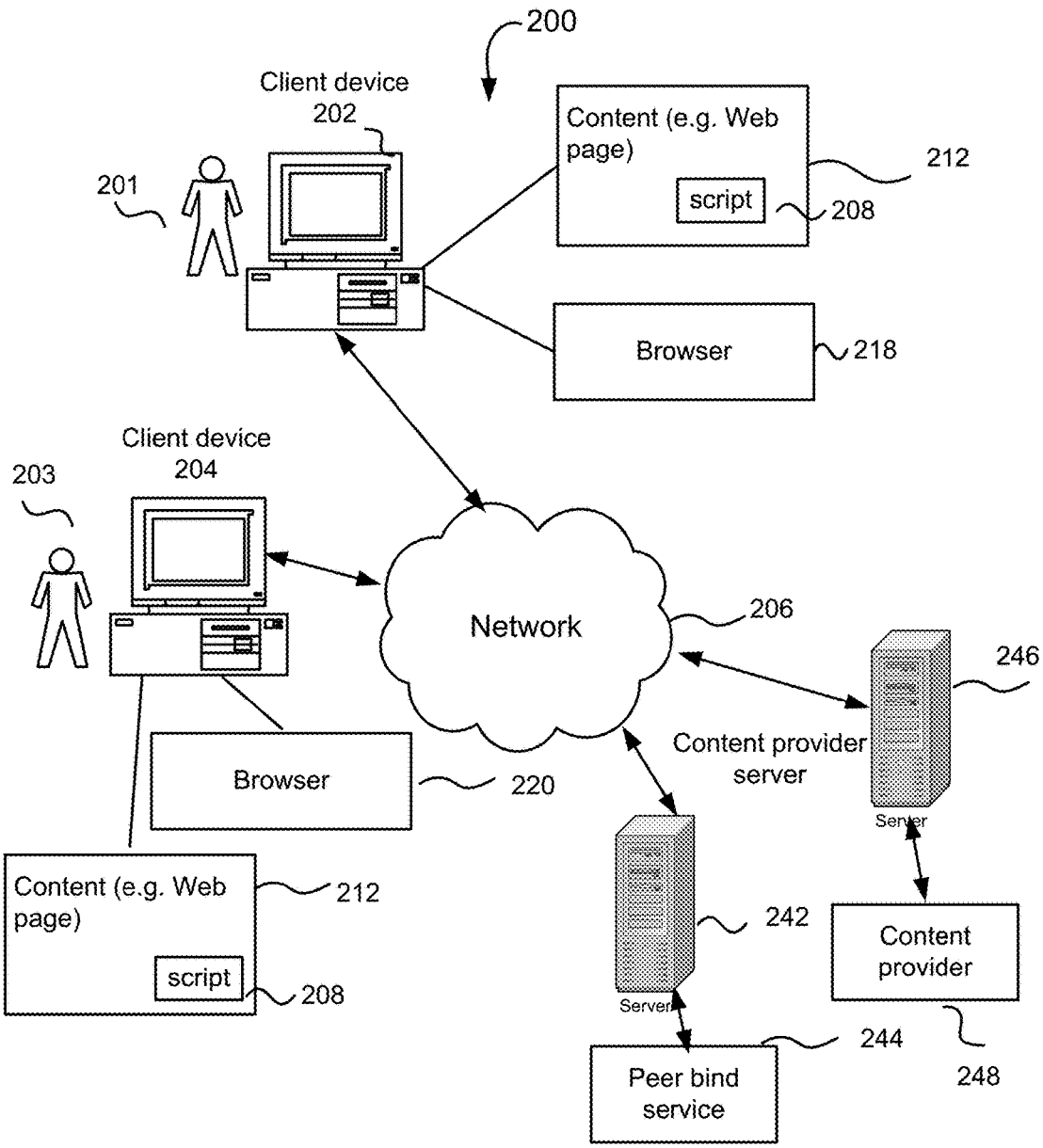
FIG. 2 illustrates an environment in which various embodiments may be practiced.

FIG. 2 shows an example environment 200 in which various embodiments may be practiced. The environment 200 may be realized utilizing one or more of the components of the environment described above in connection with FIG. 1. The environment 200, in an embodiment, includes a plurality of users 201 and 203 that utilize a network, such as the Internet 206, to browse content of various content providers using client computing devices 202 and 204. The environment 200 may utilize the Internet as a network; however, it should be understood that other networks may be used as an alternative to or in addition to the Internet. Examples of other networks include mobile networks, intranets, and generally any suitable communications network. It will be appreciated that a number of users and associated computing devices may vary and users 201 and 203 with associated computing devices 202 and 204 are shown merely for illustrative purposes.

In an embodiment, users 201 and 203 may access content provided by content providers in order to consume content, search for information, purchase items offered for consumption or sale, engage in social networking and the like. As shown in FIG. 2, the environment 200 may include a server 242 operated by a peer-bind service provider 244 and a content provider server 246 operated by a content provider 248. As will be described below in greater detail, a back end server may not be needed in some embodiments to provide and support the peer-bind functionality. As will be appreciated, a single electronic entity (not shown) may operate the system elements 242, 244, 246, and 248. Alternatively, different entities may control the elements 242, 244, 246, and 248. The electronic entity or entities may operate, affiliate with, or associate with one or more of the providers 244 and 248 in a number of different ways.

In an embodiment, the environment 200 includes components and instructions for generating one or more Web sites 212. The Web sites 212 may offer various types of content, such as electronic games, news, video, shopping or other services, search engine services, audio, social networking services, and the like. While the example environment 200 shows Web sites for the purpose of illustration, it should be understood that any type of content may be included in the environment 200 or variations thereof. Content may be provided in various ways, such as through an application interface or through other mechanisms that may not be properly classified as Web sites. In the example illustrated in FIG. 2, the content provider 248, via the content server 246, provides a Web site 212 to be rendered on browsers 218 and 220. As shown, the Web site 212 includes a script 208 that enables a peer-bind function of the Web site. In an embodiment, the users 201 and 203 may interact with content 212 in order, for example, to conduct online shopping on the Web site 212 offered by the content provider 248. As will be described below in greater detail, the Web site 212 enabled with the peer-bind function through the script 208 may provide the users 201 and 203 with an ability to share their shopping experiences by, for example, allowing each user to view the other user's shopping list or broadcast purchases made by one user to another. The peer-bind functionality and its applications will be discussed more fully below in reference to FIGS. 3-7.

Figure 3:
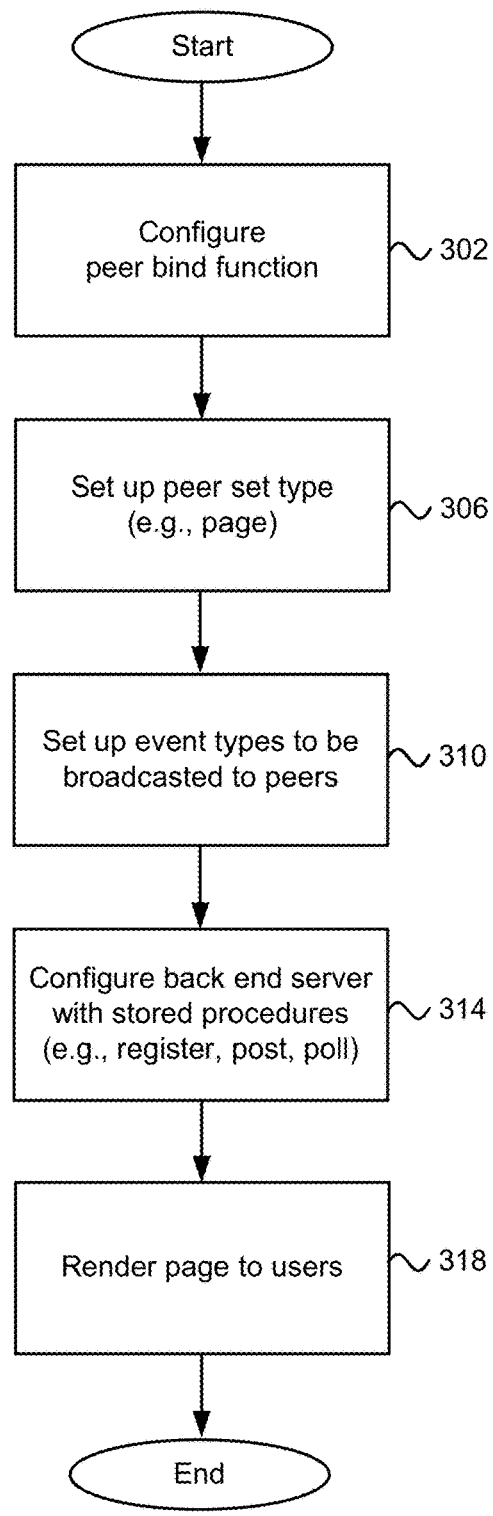
FIG. 3 illustrates a process flow diagram for configuring a Web resource with a peer-bind function in accordance with an embodiment.

FIG. 3 is a process flow diagram 300 illustrating a method for configuring a Web resource (content) such as a Web page, with a peer-bind function in accordance with an embodiment. At block 302, a trusted script implementing peer-bind function is inserted into the page. In an embodiment, a script, implemented in one embodiment as a JavaScript® and operating on the page that is loaded by a browser on a user computing device, is configured to bind peers according to a chosen criterion as described above. In some embodiments, the script may also be implemented as an ActionScript®, VBScript®, Java Servelet®, Flash®, JScript® or other scripting languages. Specifically, the trusted script, in an embodiment, may enable a peer-bind function by simply adding a word "peer" to a known command "bind" as described above. One skilled in the art will appreciate that there may be other methods to cause peer-binding: aside from the "peer bind" command. For example, a "trigger" function in scripting languages may be modified to "peer trigger" (e.g., in JavaScript®, the "trigger" component triggers other objects to react by informing its registered listeners that an event occurred). The script may be loaded on a page of the Web site 304 when a user accesses the Web site. In another embodiment, the trusted script may be implemented as an extension (i.e., a plug-in application) to the browser. In this embodiment, the script may be provided as a part of a browser or be installed as an extension to a browser.

At block 306, a peer set type is defined for a particular implementation of a peer-bind function. For example, a peer set type "page" may be set. In this instance, any user who "lands" on the page becomes a member of the peer group and, as a peer, will receive events broadcasted through the peer group (i.e., users visiting the page.) The peer set types will be described below in greater detail in reference to FIG. 6. At block 310, event types to be broadcasted to peers are provided. As described above, any kind of a user activity on the page may be broadcasted to the user's peers (e.g., mouse clicking, selecting page elements, highlighting, key pressing, and the like). There may be a great variety of event types that may be designated to be broadcasted to a peer group. The examples of events available for peer-binding may include, but are not limited to, the event types known to those skilled in the art, such as may include: click; change; keypressbundle; custom; mouseover, and the like.

At block 314, the back end server supporting the Web site enabled with the peer-bind function is configured with stored procedures, such as Java stored procedures (JSP). As described above, in one embodiment, the procedures may include, but are not limited to, "register," "post," and "poll." The "register" procedure is configured to register a queue for a particular user (browser). The "post" procedure is configured to place messages (events) in the registered queues (the queue creation and configuration will be described below in greater detail in reference to FIG. 4). The "poll" procedure is configured to handle retrieving messages for a particular user (browser). As described below in reference to FIG. 4, the "poll" procedure may not be necessary in some embodiments. It will be appreciated that the back end server may be configured with other procedures; however, the above-noted procedures may be sufficient to ensure that the peer-bind function is properly enabled on the page. At block 318, the configured content (e.g., page) may be rendered to the users. The process 300 then ends.

Figure 4:
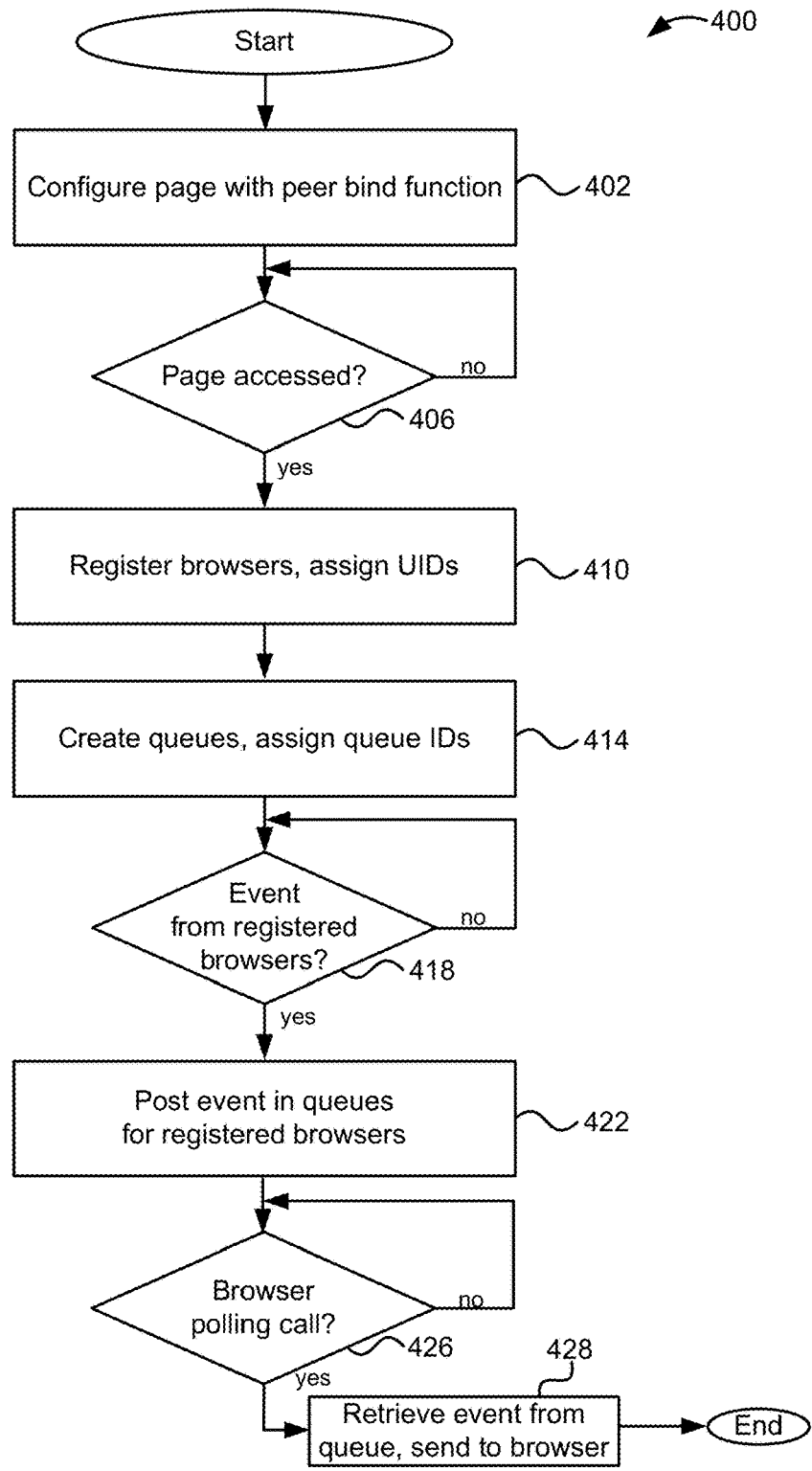
FIG. 4 illustrates a process flow diagram for implementing a peer-bind function for a peer group in accordance with an embodiment.

FIG. 4 illustrates a process flow diagram for implementing a peer-bind function for a peer group in accordance with an embodiment. The process 400 begins at block 402 where content (e.g., page) is configured with the peer-bind function as described in reference to FIG. 3. Specifically, the page may be enabled with a peer-bind function, and the event types to be broadcasted to peers may be set up. Additionally, a peer set type may be chosen, in this case, a "page" peer set type. At decision block 406, it is determined whether the page has been accessed by at least one user. If the page has been accessed, at block 410, the browsers of one or more users who accessed the page are registered, In one embodiment, each browser rendering the page is assigned a unique identifier (UID). In another embodiment, computing devices on which the page is rendered are assigned a UID. A unique identifier, in one example, refers to a unique identification number or other alphanumeric string assigned to a browser for identification purposes.

At block 414, queues for each registered browser are created and each queue is assigned a queue identifier. In one embodiment, a queue identifier may comprise a data string (e.g., hash code of a string) associated with the rendered Web page and a UID of a browser. In one embodiment, the queue generation and maintenance may be supported by a distributed queue messaging service offered by an electronic entity (e.g. Simple Queue Service® offered by Amazon-.com®). As one skilled in the art will appreciate, a queue messaging service typically supports programmatic sending of messages via Web service applications as a way to communicate over the Internet. The intent of a distributed queue messaging service is to provide a highly scalable hosted message queue that resolves connectivity and other issues that may arise in a communication over the Internet. It will be appreciated that a distributed queue messaging service is but one example of the queue generation and implementation. In one embodiment, a request may be generated to a distributed queue messaging service to create queues containing queue identifiers defined as described above.

At decision block 418, it is determined whether an event on a registered browser has occurred. The event type setup has been described above in reference to FIG. 3. By way of example, an event may include a mouse click on a particular object on the page (e.g., a "Go" button rendered on the page). If an event has occurred, at block 422, the event is posted in all queues created for registered browsers. At decision block 426, it is determined whether any browser initiated a polling call. If a browser initiated a polling call, at block 428, the events stored in the queue associated with that browser are retrieved and sent to the browser. The process 400 then ends. In one embodiment, registering, posting messages (events) in queues and retrieving messages may be performed by a back end server configured to perform the "register," "post," and "poll" procedures as described above in reference to FIG. 3. It will be appreciated that retrieving messages from queues does not have to occur only as a result of a polling call. Other methods of triggering message retrieval may be used, depending, for example, on a "push" or "pull" model utilized in a concrete implementation. For example, messages may be retrieved periodically with a predetermined time period.

As described above, in some embodiments, a Web site may support a peer-bind function instead of a back end server. In these cases, and in others involving Web resources enabled with a peer-bind function, there may be a need for an entity organizing the peer-bind and event-sharing process, i.e., a "master peer," which then may accommodate login requests, content exchanges, and the like without having to implement these functions on a server typically needed for processing message exchange functions. Accordingly, content (e.g., page) configured with the peer-bind function rendered on a browser may be designated a "master peer." Thus, a page may be encoded with an embedded trusted script that enables peer-binding as described above, e.g., JavaScript®, which will run in a page on a browser, and the exchange protocol (normally, HTTP) may be replaced by messages broadcasted with a peer-bind function. The domain representing a set of server machines may be therefore replaced by a "master peer" which identifies the browser. The master peer effectively is a browser having a globally unique identifier (GUID) and acting as the server. In one embodiment, a "master peer" may be running a script from a different content (e.g., different page) on the same domain.

Figure 5:
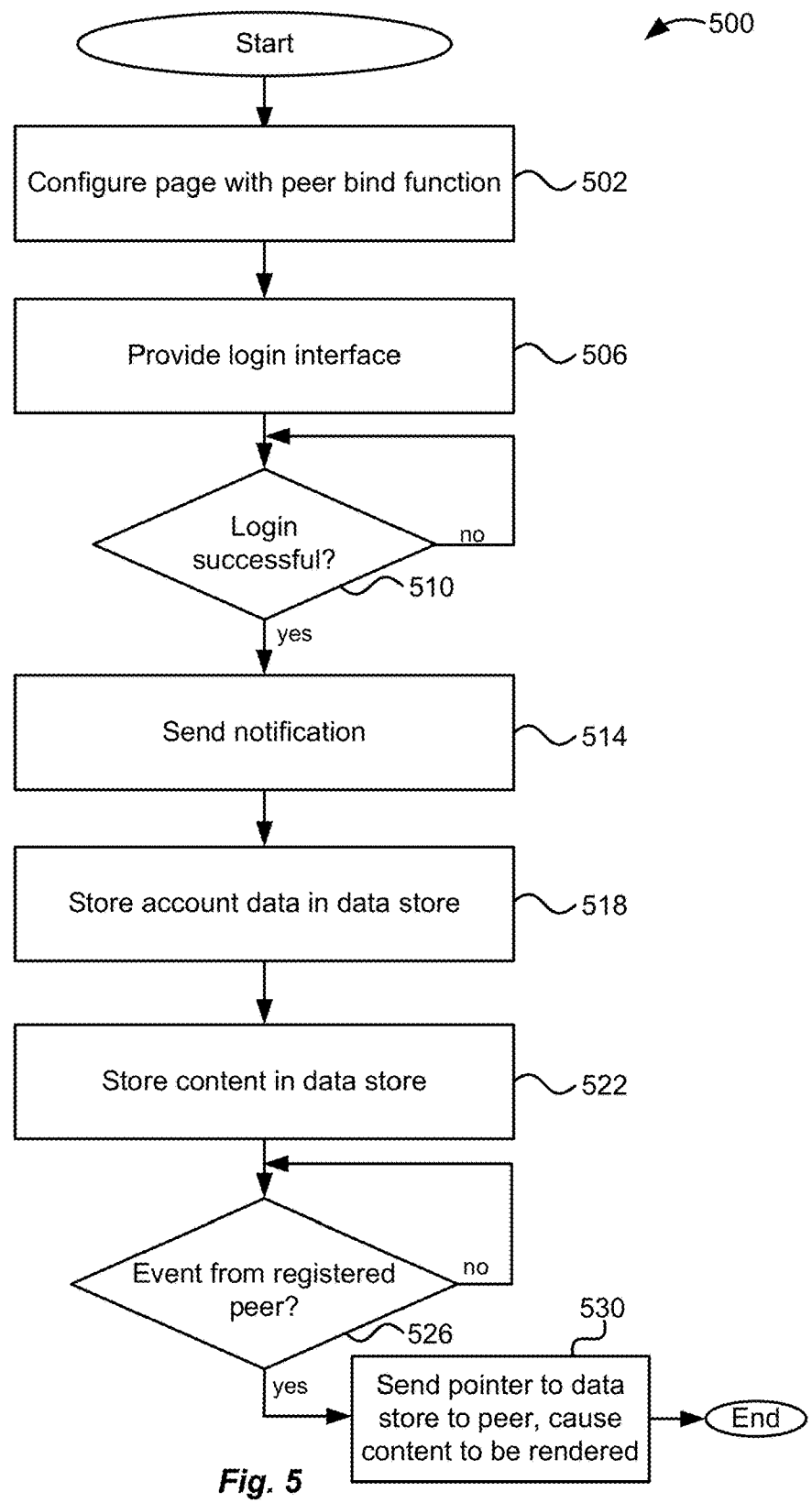
FIG. 5 illustrates a process flow diagram for a master peer routine in accordance with an embodiment.

FIG. 5 illustrates a process flow diagram for an example of a "master peer" routine in accordance with an embodiment. The process 500 begins at block 502 where the page is configured with a peer-bind function by, for example, providing a trusted script as described above. At block 506, the interface for a login may be provided to the page. At decision block 510, it is determined whether login has occurred and, if so, whether it has been successful. If the login is successful, at block 514, a notification is sent to the user who logged in to the page. The notification may contain an acknowledgment that the login has been successful. At block 518, the account data is stored in a local data store or remote data store. At block 522, the content store page is stored in a local data store or remote data store. It should be understood that the steps 502-518 are optional and are described solely for illustration purposes. Other ways of peer-binding users may be used as described above.

A local data store may be implemented in a number of different ways. For example, in an embodiment, the data store may comprise a dedicated database accessible by the peer-bind script. In some Web environments, such as, for example, one provided by the HyperText Markup Language (HTML) 5, the local data store may be allocated within a Web site or within a domain. For example, the local data store may be embedded in the pages of the Web site and may be shared with any page visited by the user on that Web site. In another embodiment, the account data and associated data may be stored in the memory of the peer-bind script loaded in a page of the Web site. In yet another embodiment, the account data and associated data may be stored in the memory of a trusted frame, such as an iFrame embedded in the Web site. Well-known methods of cross-domain communications may be utilized to exchange stored data between pages. It will be appreciated that different ways of implementing a local data store configured to store the item identifiers and related item data may be employed.

The term "remote" used in conjunction with the term "data store" above simply means that the data store is not placed in an application (such as a peer-bind-enabled Web page) operating on the computing device or in the computing device itself. The remote data stores may be accessible through the Internet or any other type of computer network known in the art. The remote data stores may be associated with an electronic entity, providing the data store services. For example, in one embodiment, a remote date store may be implemented by an online storage Web service, such as, for example, Amazon.com® S3 (Simple Storage Service)® offered by Amazon Web Services®. Typically, an online Web service provides unlimited storage through a simple Web services interface.

Referring back to FIG. 5, at decision block 526, it is determined whether an event (message) from a registered peer has been received. If such event has been received, at block 530, the pointer to a local or remote data store is sent to the peer that initiated the request. The peer event sender then may get the pointer and render the content at that pointer. The process 500 then ends.

Figure 6:
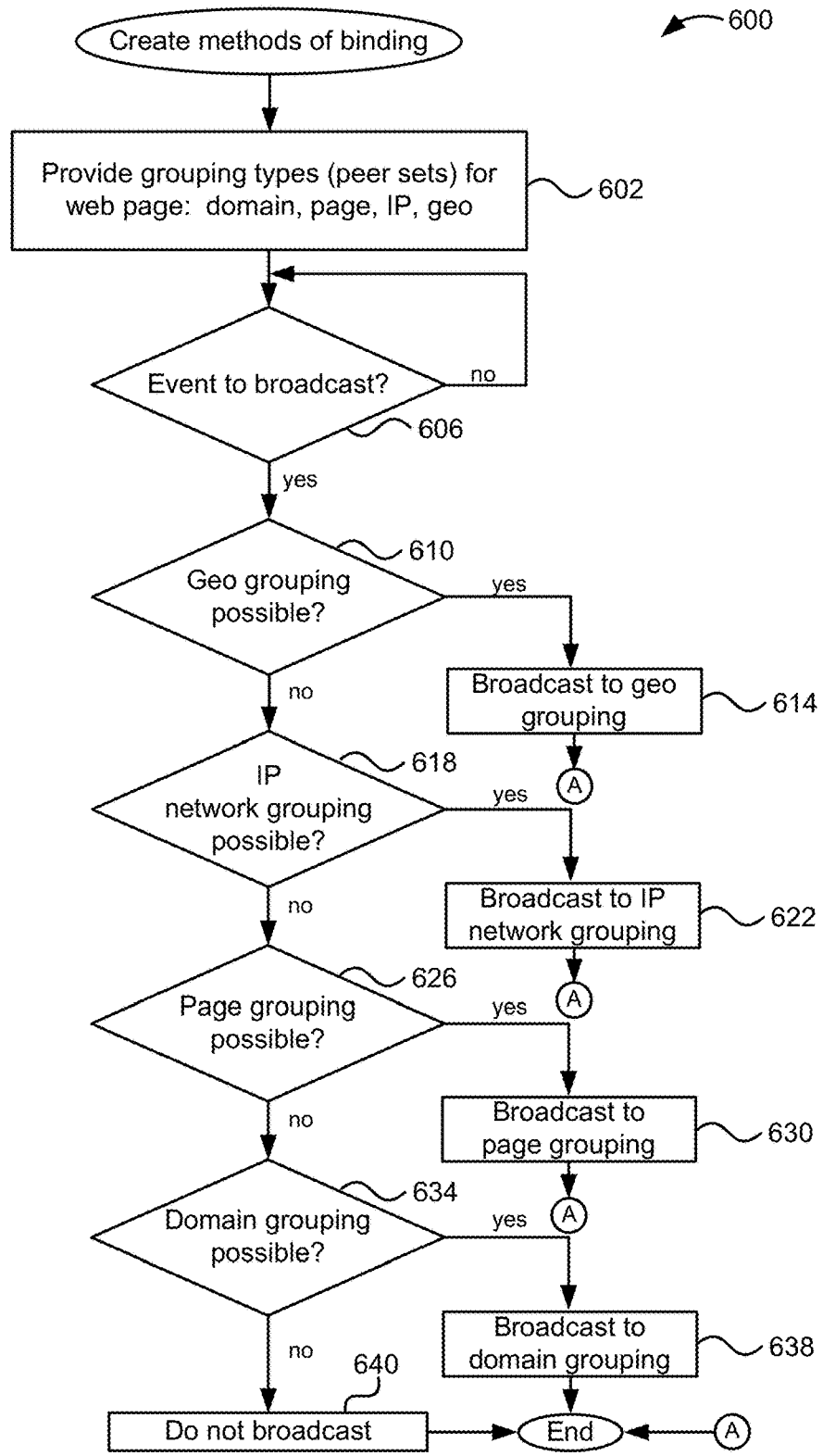
FIG. 6 illustrates a process flow diagram for configuring peer set types in accordance with an embodiment.

FIG. 6 is a process flow diagram 600 illustrating a method for configuring peer set types in accordance with an embodiment. As discussed above, there may be different ways of creating peer groups. The methods of binding users into peer groups described herein may include, but are not limited to, the following grouping methods. One method of creating a peer group may be grouping by "domain," where users that appear on the same domain may be automatically peered and events that any of the peers cause to happen will be broadcasted to the peer group. Another method of creating a peer group may be grouping by "page," where anyone who happens to visit the page automatically becomes a peer and will receive events from everyone else on the page.

Another method of creating a peer group may involve grouping by a "secret" (or "shared secret"), where a secret element (a piece of data, an icon or a combination of particular images) is placed into specific content, and only the users who typed in or otherwise provided the "shared secret" may become peer-bound, e.g., may share a common communication channel so that events (messages) caused by any peer get broadcasted to other peers through the common communication channel.

Another method of creating a peer group may be grouping by "geographic location" ("geo"), where users accessing the same content (e.g. page) and being in a physical proximity to each other (e.g., all peers are located in an approximately 100 sq. foot room or within a predetermined distance, e.g. 100 feet, from each other) may be automatically peered and will receive events from everyone else within the peer group. By way of example, if a peer-bind-enabled Web page is rendered on mobile devices (e.g., iPhones) used by a plurality of users, anybody within the same geographic location (e.g., a room) may be designated to be within the broadcast pool. Still another method of creating a peer group may be grouping by "IP," where any users accessing content over the same network or a sub-net of the same network (e.g., Wi-Fi network) are automatically peered and will receive events from everyone else within the peer group.

Selection of the peer set types may be organized, for example, in a "fallback" fashion, as illustrated in FIG. 6. The process 600 begins at block 602, where peer set types for a Web page are provided. As described above, the peer set types may include, but are not limited to, "domain," "page," "IP" (or "IP network grouping"), "geo," and "shared secret." As will be described below, for this particular example, a grouping by "shared secret" may not apply. At decision block 606, it is determined whether an event to be broadcasted has occurred. If the event has occurred, at decision block 610, it is determined whether the "geo" grouping is possible. If the "geo" grouping is possible, at block 614, the event is broadcasted to the "geo" grouping. If the "geo" grouping is not possible, the process moves to decision block 618 where it is determined whether an "IP network grouping" is possible. If the "IP network grouping" is possible, at block 622, the event is broadcasted to the IP network grouping. If the "IP network grouping" is not possible, the process moves to decision block 626 where it is determined whether the "page" grouping is possible. If it is determined that the "page" grouping is possible, at block 630, the event is broadcasted to the "page" grouping. If the "page" grouping is not possible, the process moves to decision block 634 where it can determine whether the "domain" grouping is possible. If the "domain grouping" is indeed possible, at block 638, the event is broadcasted to the domain grouping. If the "domain grouping" is determined to be impossible, at block 640, the event is not broadcasted. The process 600 then ends.

There may be different reasons as to why a particular peer set type may not be possible in a particular situation. For example, a pool of people visiting the same page may be too big for a "page" grouping. In that case, a "domain" grouping may be chosen instead. Similarly, a "geo" grouping may not be possible if it is supposed to group people who have mobile devices configured to be operated within a "geo" grouping, but not everybody in the particular location has such mobile devices. In that case, the "fallback" grouping may be a grouping based on the same IP network. It is understood that the sequence of fallback groupings described above is merely illustrative; different grouping fallback sequences may be created depending upon particular circumstances.

Figure 7:
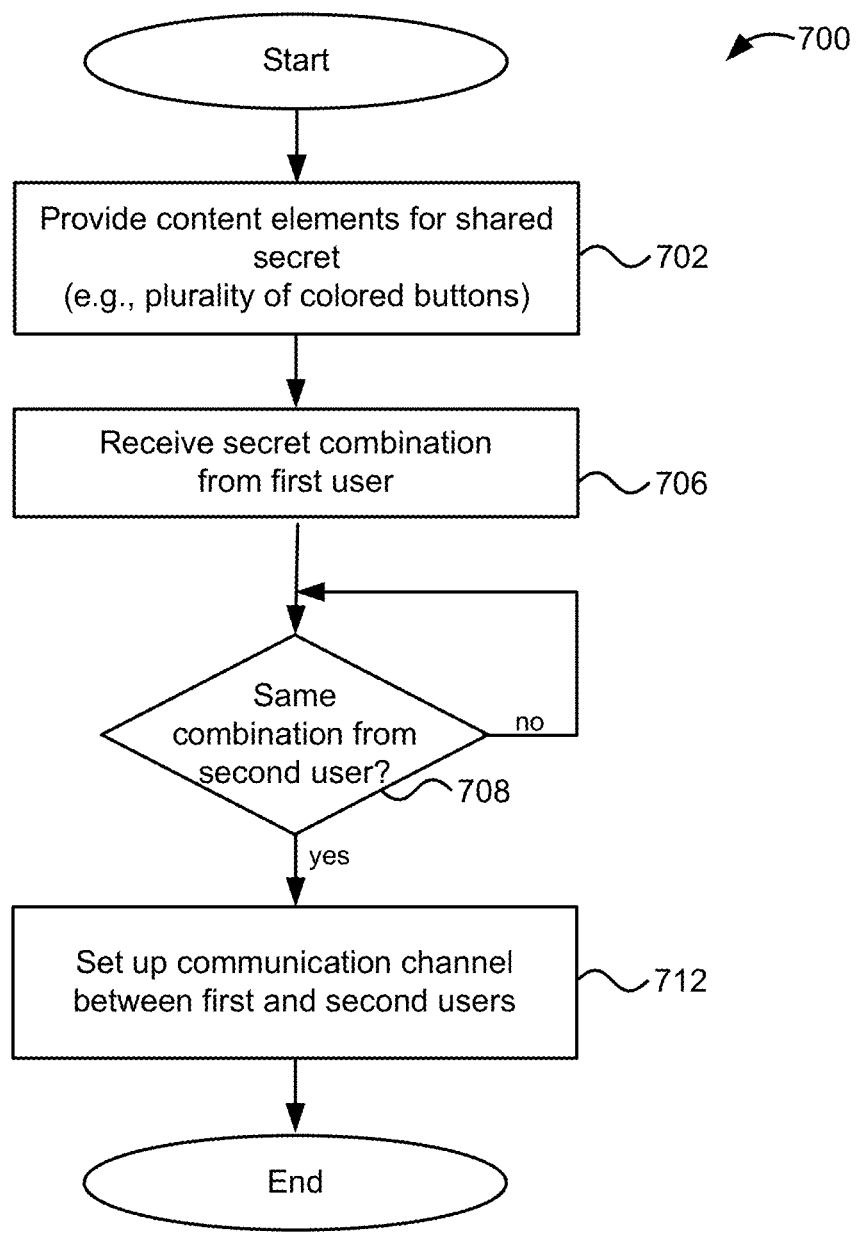
FIG. 7 illustrates a process flow diagram for a "shared secret" grouping in accordance with an embodiment.

FIG. 7 is a process flow diagram illustrating an example 700 of a "shared secret" grouping method in accordance with an embodiment. It will be appreciated that a peer grouping (peer-binding) by a "shared secret" may be used in any peer-to-peer technology, not just the peer-bind technology described herein. A method of creating a peer group by a "shared secret" has been briefly described above. In one embodiment, a secret element (a piece of data, an icon or a combination of particular images) is placed into the page and only the users who enter a combination comprising the secret element ("shared secret") may become peer-bound, e.g., may share a common communication channel and may share events caused by peers through the common channel. In principle, any number of content elements, from which a "shared secret" may be comprised, may be placed into content and there may be numerous ways of creating a "shared secret."

In one embodiment, a "shared secret" grouping may be implemented by rendering on a Web resource (e.g., a page) a plurality of colored buttons (for example, blue, red, green and yellow). A particular, e.g., predetermined by a peer group organizer ("master peer"), combination of colors (e.g., blue-blue-red-green) would establish a common communication channel between those users who used that combination on the rendered page. In another embodiment, a "shared secret" may be an icon, a pictogram, an image, or a piece of data (e.g., text) among a plurality of icons, pictograms, images, or pieces of data rendered on a computing device screen that may be accessed, resulting in creating a "secret," e.g., a particular data string comprising a security sequence.

In one embodiment, every content element having a particular property (e.g., a button of green color or an icon of a particular shape) may have a unique identifier associated with the content element. Thus, accessing a number of content elements may result in creating a data string comprising a combination of unique identifiers associated with the accessed content elements. For example, a user may click on a subset of images in a particular sequence or click on one or more images (icons, buttons, etc) a predetermined number of times. If each image has a unique identifier associated with the image, a particular security sequence ("shared secret") will be entered and detected by a trusted script providing peer-binding functionality as described above. A shared secret does not have to be determined by a group organizer (although the shared secret may be provided with a trusted script embedded in a page of Web content), but may be defined by any user who wants to share a communication channel with other users. In this case, a user may communicate the secret (e.g., a chosen combination of colored buttons to click on) to the users that he/she would like to include in peer group sharing the same communication channel. The common communication channel will enable the users entering the same shared secret to broadcast events produced by any of the users to all other users in the peer group.

Communicating the "shared secret" to other users may be implemented in a number of different ways. In general, the users may agree among themselves what type of "shared secret" is to be used. For example, one user may simply telephone or otherwise contact another user and communicate a "shared secret" to be used. The content may be peer-bind-enabled with a trusted script as described above. All users visiting the page will be peer-bound and could see all events produced by other users visiting the page as in the described-above peer grouping by "page." Let us assume that the peers-to-be visiting the peer-bind-enabled page agree on a predetermined number of times a particular content element (e.g., a box rendered among other boxes on the page) may be accessed, e.g., "wiggled." If, for example, there are ten colored boxes rendered on a peer-bind-enabled page and it is agreed that peers-to-be will be watching the third box from the right, when one user starts "wiggling" the third box, the other users watching the third box may count a number of times the third box is "wiggled." Once the number of "wiggles" is counted, the count may be entered in a "secret" box also rendered on a page and those users who entered the correct count will become peer-bound by "shared secret." The described method is but one example of communicating the "shared secret" between the users. It will be appreciated that various methods of communication of a "shared secret" may be used.

There may be many different applications of common communication channels for a peer group. For instance, common communication channels created by a "shared secret" may be used for educational purposes. In one example, parents may use common communication channels with their children in order to control the children's homework assignments by monitoring the children's activities on the Internet (e.g., typing, browsing, and the like) in real or near-real time.

In the above example, all users on the common communication channel may see movements of page elements by other users. The movements of page elements may be provided, for example, by creating a "touch bundle" function for "touch" events and "peer-binding" the created touch-bundle function. In other words, when a user touches and moves around a page element (e.g., a square on the page), the other users see it in near-real time "playback" fashion. This effect may be accomplished by recording the time each of the mouse movement events occurs, bundling the mouse events, and providing the time in the bundled mouse event so that it replays at the same speed on the peers' computer screens. In another example, a "mouse bundle" function may be created that would bundle the "mouse-click" events similar to the "touch bundle" function.

Referring now to process 700, at block 702, content elements that may be used for creating a "shared secret" (e.g., colored buttons) are rendered with peer-bind-enabled content (e.g., page). At block 706, the shared combination comprising a shared secret is received from a first user accessing the content. At decision block 708, it is determined whether input of the secret combination has been received from any other user, e.g., a second user accessing the content. If the secret combination from the second user has been received, at block 712, a communication channel is set up between the first and second users who input the same secret combination into the page. In one embodiment, the communication channel is implemented as follows. Once a shared secret message from the first user is received, a queue associated with the first user is created. Similarly, upon receiving the shared secret message from the second user, a queue associated with the second user is created. The queue creation was described in greater detail in reference to FIG. 4. Subsequently, any events (messages) generated by the first user will be placed in the queue associated with the second user and vice versa. The messages will then be retrieved from the respective queues (in one embodiment, upon request from a user's client computing device) and rendered on each peer-bound user's browsers. The process 700 then ends.

Figure 8:
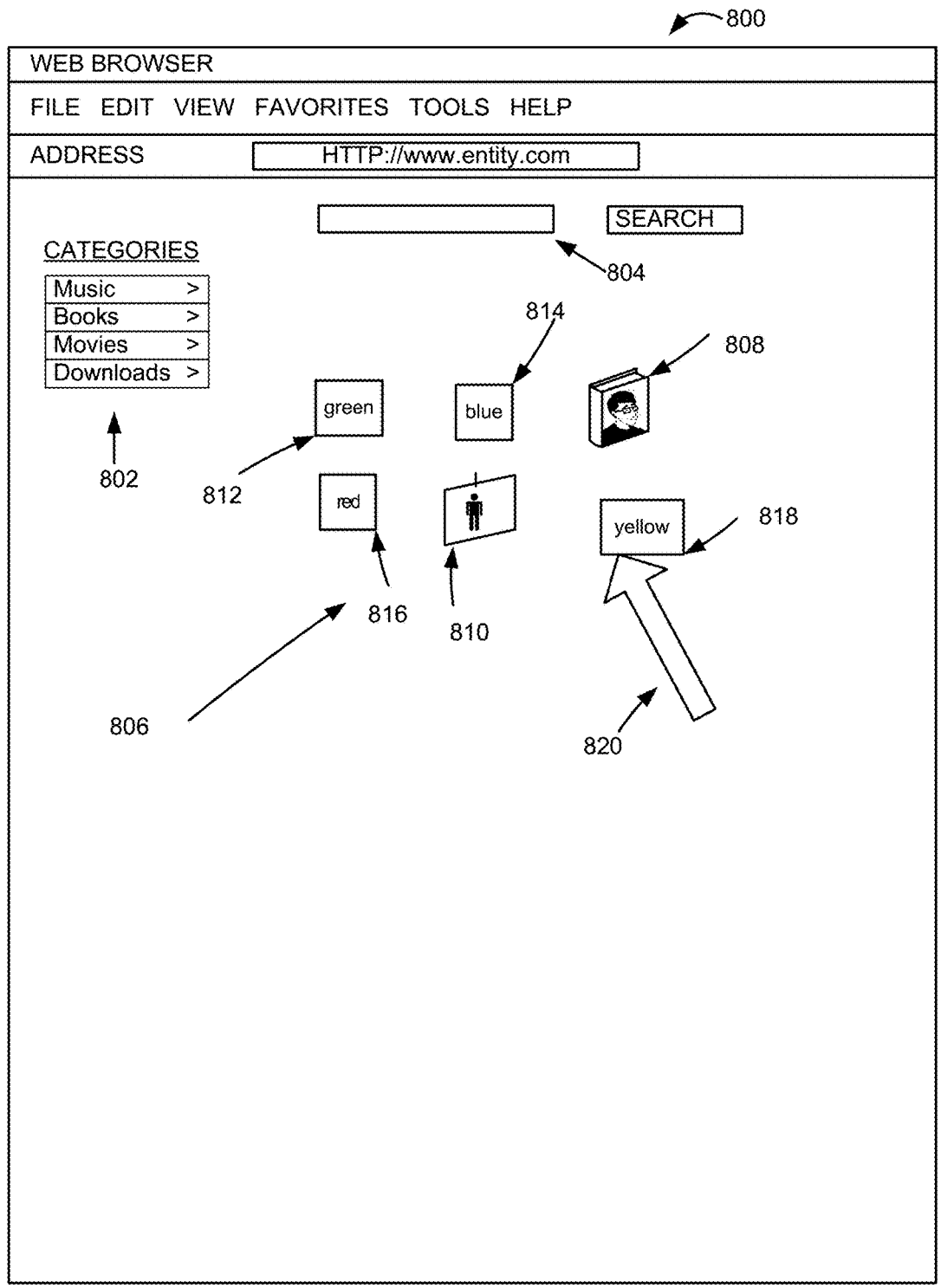
FIG. 8 illustrates an exemplary Web page showing content elements that may be used for peer-binding by a "shared secret" in accordance with an embodiment.

FIG. 8 illustrates an exemplary Web page 800 showing content elements that may be used for peer-binding by a "shared secret" in accordance with an embodiment. FIG. 8 represents but an example of Web content on which peer-binding by a "shared secret" may be implemented. Accordingly, the embodiments for peer-binding by a "shared secret" described herein should not be construed as limited to implementation on a particular type of Web content, e.g., to an example of a Web merchant Web page illustrated in FIG. 8. The Web page illustrated in FIG. 8 includes a number of illustrative item categories 802 as shown on the left side of the page 800, such as "music," "books," "movies," and "downloads." It will be appreciated that any number of item categories of any kind may be included in the Web page. The illustrative page 800 includes the search window 804 and the search button. It will be appreciated that any type of additional content associated with items may be presented on the Web page.

In addition, a number of content elements 806 is rendered on the Web page 800. As described above, various types and/or shapes of content elements may be suitable for peer-binding by a "shared secret," e.g., a button, a piece of data, an icon, an image, a geometrical figure, and the like. Accordingly, a few different types of content elements are shown in FIG. 8. For example, elements 808 and 810 represent icons of different shapes and sizes that include different images (e.g., an image of a person's head in the element 808 and a person's pictogram in the element 810). Content elements 812-818 illustrate buttons of various colors (green, blue, red, and yellow, respectively). As described above, when at least two users access the same element or elements in the same manner, sequence, or the same number of times, they will become peer-bound. For example, if a user of a client computing device, on which the Web page 800 is rendered, accesses with a cursor 820 (e.g., clicks) the yellow button 818 five times, and then another user of a different client computing device, on which the Web page 800 is rendered, completes the same exact action (clicks on the yellow button 818 five times), the two users will become peer-bound.

In one embodiment, a Web resource enabled with a peer-bind function may facilitate functionality sharing among users. For example, not all existing browsers support rendering of various objects (elements) on a Web page. In the case of a peer-bind-enabled Web page, if a particular browser does not have functionality sufficient to support all of the page elements, other peer browsers may be requested to provide the functionality lacking by the particular browser. For example, a particular browser may lack an ability to display a particular picture. In that case, other peers may be asked to compute the picture and send it back to the browser for rendering.

Figure 9:
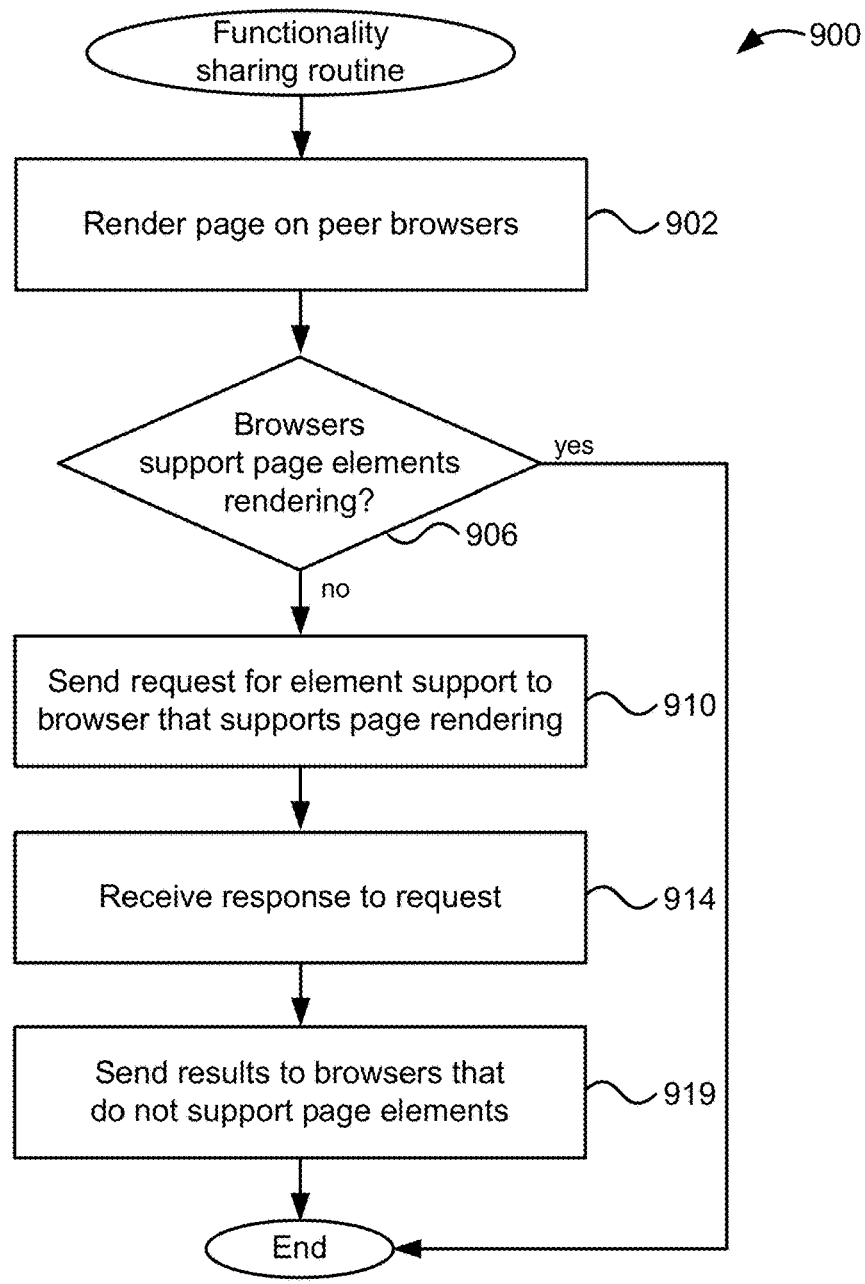
FIG. 9 illustrates a process flow diagram for a functionality sharing routine in accordance with an embodiment.

FIG. 9 illustrates a process flow diagram for a functionality sharing routine in accordance with an embodiment. The routing may be performed by a "master peer" described above. The process 900 begins at block 902 where a Web page is rendered on the peer browser. At decision block 906, it is determined whether old browsers support the page elements that are rendered on the Web page. If it is determined that there is at least one browser that does not support all of the elements that are rendered on the page, at block 910, a request for element support is sent to at least one browser that supports page element rendering. At block 914, a response to the request is received. The response may contain data for the page element computed such that the element is now configured to be rendered by the browser that lacks a required functionality. At block 919, the response to the request (e.g., the results of the above calculation) is sent to the browser that lacks functionality required to render the page element. The process 900 then ends.

It will be appreciated that there are many more applications of Web resources (content) enabled with peer-bind functions. For example, in the case of online customer service, a customer may call in with a question regarding a particular application. A customer service representative may assign the customer as a peer using one of the above-described methods, for example, establishing a common communication channel via a "shared secret." The customer service representative them may interactively communicate with the customer, watch the customer's actions online, direct the customer, and the like. In another example, a computer game, initially configured to be played by one player (on one computing device), may be peer-bind-enabled and thus reconfigured to be played by a plurality of peers over a network, e.g., Internet.

In another example, a project (e.g., a project facilitated by SETI@Home®) may be shared among peers far more easily than it normally would be as the task completion would no longer require a back end support and/or installing additional software, but could be done by a peer-bind method utilizing, for example, public data storages for peers and task distribution among peers utilizing the peer-bind functionality. In another example, peers may share or sell their CPU cycles to other peers. A peer may dedicate a tab on a peer-bind-enabled Web page that could be shared with, or sold to, other peers. In yet another example, peers could do shared shopping online using common communication channels set up through a "shared secret" method. In this example, the peers, who share the communication channel established through a "shared secret," may have visibility of their peers' shopping carts or wishlists: every item dropped in one peer's shopping cart will be present to other peers for inspection. It will be appreciated that there may be many more examples of utilizing a peer-bind technology described herein.

As discussed above, the various embodiments can be implemented in a wide variety of operating environments, which in some cases can include one or more client computers, computing devices, or processing devices which can be used to operate any of a number of applications. Client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response to requests from client devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation, those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices, such as random access memory ("RAM") or read-only memory ("ROM"), as well as removable media devices, memory cards, flash cards, and the like.

Such devices also can include a computer-readable storage media reader, a communications device (e.g., a modem, a network card (wireless or wired), an infrared communication device), and working memory as described above. The computer-readable storage media reader can be connected with, or configured to receive, a computer-readable storage medium, representing remote, local, fixed, and/or removable storage devices, as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer-readable media for containing code, or portions of code, can include any appropriate media known or used in the art, including storage media and communication media, such as, but not limited to, volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the present disclosure as set forth in the claims.

What is claimed is:

1. A computer-implemented method, comprising:
under the control of one or more computer systems configured with executable instructions,
determining a set of actions from a group of users;
generating an admission key based at least in part on the set of actions;
embedding in at least one page of a Web site a trusted script capable of being executed on at least one client computing device, the trusted script configured to generate a queue at a browser for the at least one client computing device in response to the at least one client computing device receiving an indication of the admission key, the admission key comprised of a particular selection of a combination of a plurality of content elements;
displaying the at least one page;
generating a first queue at a first client computing device browser in response to receiving an indication the admission key from the first client computing device browser executing the trusted script;
receiving a second indication of the admission key, the second indication of the admission key comprising a second selection of a second combination of the plurality of content elements from a second client computing device browser executing the trusted script;
determining that the first indication of the admission key matches the second indication of the admission key;

placing event information associated with a first event on the second client computing device in the first queue in response to the first indication of the admission key matching the second indication the admission key;

receiving from the first client computing device a first request associated with the first queue; and sending the event information associated with the first event from the first queue to the first client computing device.

2. The computer-implemented method of claim 1, wherein sending event information to a client computing device causes an updating of a page of the Web site displayed on the client computing device, and wherein sending the event information associated with the first event from the first queue to the first client computing device causes an updating of the at least one page of the Web site on the first client computing device.

3. The computer-implemented method of claim 2, further comprising:

generating a second queue associated with the second client computing device in response to the first indication of the admission key matching the second indication of the admission key;

placing event information associated with a second event on the first client computing device in the second queue;

receiving from the second client computing device browser a second request associated with the second queue; and sending the event information associated with the second event from the second queue to the second client computing device.

4. The computer-implemented method of claim 3, wherein the first queue and the second queue are created by a browser associated with a client computing device.

5. The computer-implemented method of claim 3, further comprising:

determining that the client second computing device is unable to render an element of the page;

causing the first client computing device to process the element of the page; and sending the processed element of the page to the second client computing device for rendering.

6. The computer-implemented method of claim 1, wherein each of the indications of the admission key is associated with a unique identifier, wherein a third selection of at least one content element creates a data string representing a sequence of the third selection of the at least one content element, and further comprising:

receiving an indication of a fourth selection of two or more content elements, wherein the fourth selection comprises an ordered sequence.

7. The computer-implemented method of claim 6, wherein a content element includes at least one of an image, an icon, a piece of data, a combination of images, a pictogram, a text string, a button, or a geometrical figure.

8. The computer-implemented method of claim 6, wherein the sequence of the fourth selection of the two or more content elements includes at least one of a number of touches on a touch-sensitive device associated with the two or more content elements or a number of movements associated with the two or more content elements.

9. A computer-implemented method, comprising:

under the control of one or more computer systems configured with executable instructions, determining a set of actions from a group of users;

generating an admission key based at least in part on the set of actions;

generating a first queue at a first client computing device browser executing a trusted script embedded in at least one page of a Web site in response to receiving an indication of the admission key, the indication of the admission key comprising a first selection of a first input from the first client computing device browser;

receiving a second indication of the admission key, the second indication of the admission key comprising a second selection of a second input from a second client computing device browser executing the trusted script;

determining that the first indication of the admission key matches the second indication of the admission key, wherein each of the first indication of the admission key and the second indication of the admission key comprises an indication of a third selection of two or more content elements, and wherein the third selection comprises an ordered sequence;

placing event information associated with a first event on the second client computing device in the first queue in response to the first indication of the admission key matching the second indication of the admission key;

receiving from the first client computing device a first request associated with the first queue; and sending the event information associated with the first event from the first queue to the first client computing device.

10. The computer-implemented method of claim 9, further comprising:

creating a second queue associated with the second client computing device in response to the first indication of the admission key matching the second indication of the admission key;

placing event information associated with a second event on the first client computing device in the second queue;

receiving from the second client computing device a second request associated with the second queue; and sending the event information associated with the second event from the second queue to the second client computing device.

11. The computer-implemented method of claim 9, further comprising:

determining that the second client computing device is unable to render an element of the page;

causing the first client computing device to process the element of the page; and sending the processed element of the page to the second client computing device for rendering.

12. A computer system, comprising a processor and a memory having computer-executable instructions that, when executed on the processor, cause the processor to:

determine a set of actions from a group of users;

generate an admission key based at least in part on the set of actions;

generate a first queue at a first client computing device browser executing a trusted script embedded in at least one page of a Web site in response to receiving an indication of the admission key, the indication of the admission key comprising a first selection of a first combination of a plurality of content elements from the first client computing device browser;

receive a second indication the admission key, the second indication of the admission key comprising a second selection of a second combination of the plurality of content elements from a second client computing device browser executing the trusted script;

determine that the first indication of the admission key matches the second indication of the admission key;

place event information associated with a first event on the second client computing device in the first queue in response to the first indication the admission key matching the second indication of the admission key;

receive from the first client computing device a first request associated with the first queue; and send the event information associated with the first event from the first queue to the first client computing device.

13. The computer system of claim 12, wherein sending event information to a client computing device causes an updating of a page of the Web site displayed on the client computing device, and wherein sending the event information associated with the first event from the first queue to the first client computing device causes an updating of the at least one page of the Web site on the first client computing device.

14. The computer system of claim 13, wherein the computer-executable instructions further cause the processor to:

generate a second queue associated with the second client computing device in response to the first indication of the admission key matching the second indication of the admission key;

place event information associated with a second event on the first client computing device in the second queue;

receive from the second client computing device a second request associated with the second queue; and send the event information associated with the second event from the second queue to the second client computing device.

15. The computer system of claim 14, wherein the first queue and the second queue are created by a browser associated with a client computing device.

16. The computer system of claim 14, wherein the computer-executable instructions further cause the processor to:

determine that the second client computing device is unable to render an element of the page;

cause the first client computing device to process the element of the page; and send the processed element of the page to the second client computing device for rendering.

17. The computer system of claim 12, wherein each of the indications of the admission key is associated with a unique identifier, wherein a third selection of at least one content element creates a data string representing a sequence of the third selection of the at least one content element, and wherein the computer-executable instructions further cause the processor to:

receive an indication of a fourth selection of two or more content elements, wherein the fourth selection comprises an ordered sequence.

18. The computer system of claim 17, wherein a content element includes at least one of an image, an icon, a piece of data, a combination of images, a pictogram, a text string, a button, or a geometrical figure.

19. The computer system of claim 17, wherein the sequence of the fourth selection of the two or more content elements includes at least one of a number of touches on a touch-sensitive device associated with the two or more content elements or a number of movements associated with the two or more content elements.

* * * * *